United States Patent [19]

Goulet et al.

[11] Patent Number: 5,273,216

[45] Date of Patent: Dec. 28, 1993

[54] OXY-FUEL CUTTING TIP HAVING SWAGED GAS OUTLET PASSAGES

[75] Inventors: Richard Goulet, Montreal; Claude Forest, Joliette; Michel Landry, Mascouche; Pierre Beaubien, Montreal; Michael Finkelstein; Viwek V. Vaidya, both of Pointe-Claire, all of Canada

[73] Assignee: Canadian Liquid Air Ltd. - Air Liquide Canada Ltee, Montreal, Canada

[21] Appl. No.: 755,064

[22] Filed: Sep. 5, 1991

[51] Int. Cl.$^5$ .............................. B05B 7/06
[52] U.S. Cl. ................... 239/427.5; 239/434.5; 239/404; 239/590.5
[58] Field of Search .............. 239/424, 424.5, 425, 239/590.5, 403, 404, 427.3, 427.5

[56] References Cited

U.S. PATENT DOCUMENTS

| 1,087,767 | 2/1914 | Hoffman | 239/404 |
|---|---|---|---|
| 1,342,732 | 6/1920 | Anthony | 239/404 |
| 2,499,524 | 3/1950 | Pach | 239/424 |
| 2,520,001 | 8/1950 | Eicher | 239/424.5 |
| 2,829,709 | 4/1958 | Mathews | 239/424.5 |
| 2,993,531 | 7/1961 | Spies, Jr. et al. | 239/424.5 |
| 3,053,312 | 9/1962 | Villoresi | 239/424.5 |
| 3,433,418 | 3/1969 | Hach, Jr. | 239/424.5 |
| 3,583,643 | 6/1971 | Ollivier | 239/424.5 |
| 4,200,235 | 4/1980 | Moschke | 239/424.5 |
| 4,408,690 | 10/1983 | Ferrero . | |
| 4,429,828 | 2/1984 | Farber . | |
| 4,512,472 | 4/1985 | Jarund . | |
| 4,582,213 | 4/1986 | Park et al. . | |
| 4,610,649 | 9/1986 | Friess . | |
| 4,778,053 | 10/1988 | Hakansson . | |
| 4,806,021 | 2/1989 | Koudstaal et al. . | |
| 4,969,308 | 11/1990 | Hakansson . | |
| 5,025,947 | 6/1991 | Leone . | |
| 5,052,614 | 10/1991 | Xuan . | |
| 5,054,684 | 10/1991 | Farber et al. . | |

FOREIGN PATENT DOCUMENTS

| 1053138 | 4/1979 | Canada . | |
|---|---|---|---|
| 949608 | 9/1949 | France | 239/424.5 |
| 97583 | 1/1961 | Norway | 239/424.5 |
| 861510 | 2/1961 | United Kingdom | 239/424.5 |

Primary Examiner—Andres Kashnikow
Assistant Examiner—Christopher G. Trainor
Attorney, Agent, or Firm—Oblon, Spivak, McClelland, Maier & Neustadt

[57] ABSTRACT

A multi-part oxy-fuel cutting tip has mixture outlet passages formed by swaging the tip skirt to form grooves. The grooves then cooperate with the tip core to form the outlet passages when the skirt is placed over the tip core. Oppositely directed circumferential inlet passages for the preheat oxygen and fuel promote rapid mixing while producing a non-rotating mixture flow. In addition, the sectional areas of the outlet passages decrease in the flow direction. These features promote the rapid creation of a laminar mixture flow.

13 Claims, 3 Drawing Sheets

OXY-FUEL CUTTING TIP HAVING SWAGED GAS OUTLET PASSAGES

BACKGROUND OF THE INVENTION

Field of the Invention

The present invention relates to an oxy-fuel cutting tip. More particularly, the present invention relates to an oxyacetylene cutting tip formed of a separate tip core and swaged skirt which cooperate to form gas outlet passages.

Description of the Related Art

Oxy-fuel cutting tips such as oxyacetylene cutting tips must be capable of mixing and discharging oxyacetylene gas and preheat oxygen which combust to preheat a workpiece to be cut, and also must be capable of discharging cutting oxygen during a cutting operation. Conventionally, oxyacetylene cutting tips have been formed from a single piece of copper bar stock. For example, as seen in FIG. 1 a conventional oxyacetylene cutting tip is formed from an annular copper body 202 having a central bore 204 forming a cutting gas passage. This central bore is deep drilled in the body 202. Also deep drilled in the body 202 are passages 206 and 208 for preheat oxygen and acetylene gas, and radial inlet passages 210 and 212 for feeding gases to the gas passages 206 and 208. Such a tip is inherently costly to produce, primarily due to the requirement for deep drilling operations.

Multi-piece cutting tips have also been known. For example, the multi-piece cutting tips use a tip core such as those seen in FIGS. 2 and 3. The tip core 302 of FIGS. 2 and 3 has a drilled central passage 304 through which cutting oxygen is discharged. Although not shown, a skirt concentrically surrounds the tip core and forms an annular passage through which acetylene gas and preheat oxygen delivered via the drilled passages 306 and 308 mix and flow toward the outlet end 310 of the tip core. Grooves 312 are milled in the tip core near the outlet end 310 and cooperate with the unillustrated skirt to form outlet passages for the preheat oxygen and acetylene gas mixture. However, the need to mill or machine the grooves 312 in the tip core contributes to high manufacturing costs for the cutting tip.

In order to ensure complete combustion of the acetylene gas, it should be thoroughly mixed with the preheat oxygen prior to discharge through the outlet passages. Conventionally, if such complete combustion were required, it was thought necessary to have a relatively long passage in which the acetylene gas and preheat oxygen mixture are thoroughly mixed prior to discharge from the cutting tip. Canadian patent no. 1053138, assigned to the Victor Equipment Company, disclosed a swirl mix system in which the preheat oxygen is swirled in such a way as to create a vortex and the acetylene gas is mixed with this vortex. While this creates a homogeneous gas mixture in a relatively short travel length, and so permits the use of a relatively short cutting tip, the swirling motion of the resulting mixture interferes with the rapid formation of a laminar gas flow for discharge from the cutting tip. Such laminar gas flow is desirable since a turbulent gas flow will create pressure fluctuations which interfere with flame stability.

SUMMARY OF THE INVENTION

It is therefore an object of the present invention to provide a cutting tip which is simple and inexpensive to manufacture.

It is a further object of the present invention to provide a cutting tip formed of several parts, and which does not require deep drilling or extensive machining.

It is a further object of the invention to provide a cutting tip capable of producing a laminar flow of mixed preheat oxygen and a fuel gas in a short axial length.

According to one aspect of the invention, the above and other objects are achieved by an oxy-fuel tip comprising a tip core, a skirt concentrically surrounding the tip core so as to form an annular passage therebetween, and inlet means for supplying at least a fuel gas to the annular passage. An outlet portion of the skirt is swaged to form gas outlet passages in cooperation with the tip core.

According to another feature of the invention, an oxy-fuel cutting tip comprises a mixer having cutting oxygen, preheat oxygen and acetylene inlets, a tip core fittable into the mixer so as to communicate with the cutting oxygen inlet and having a cutting oxygen passage extending therethrough to an outlet end thereof, and a skirt concentrically surrounding the tip core so as to form an annular passage therebetween. The skirt is swaged to define a tapered outlet end having internal grooves. An opposite end of the skirt opposite the outlet end is fittable into the mixer such that the annular passage communicates with the preheat oxygen and fuel inlets and such that the internal grooves cooperate with the tip core to define outlet passages for the annular passage.

According to yet another feature of the invention, an oxy-fuel cutting tip comprises a tip core and a skirt defining an annular passage and outlet passages through which a fuel gas and preheat oxygen can flow toward an outlet of the tip, and inlet means including a preheat oxygen inlet and a fuel gas inlet for supplying the fuel gas and preheat oxygen to the annular passage. The preheat oxygen inlet comprises means for introducing the preheat oxygen into the annular passage with a first circumferential flow velocity component. The fuel gas inlet comprises means for introducing the fuel gas into the annular passage with a second circumferential flow velocity component which is opposite to the first flow velocity component, whereby the circumferential flow velocity components are substantially canceled.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
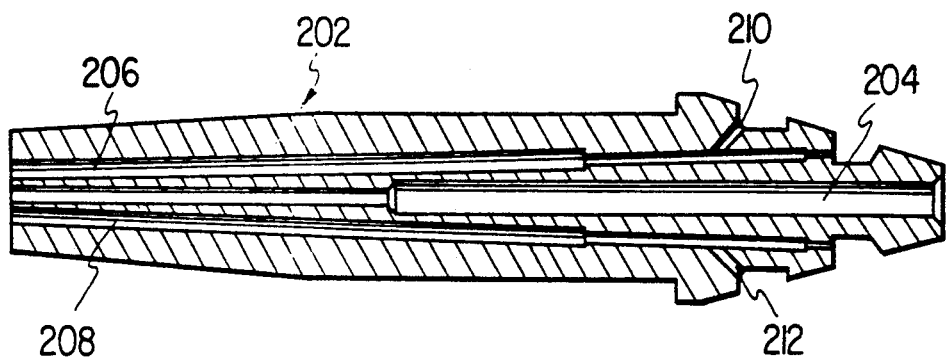
FIG. 1 is a longitudinal sectional view of a conventional single piece cutting tip.
Figure 2:
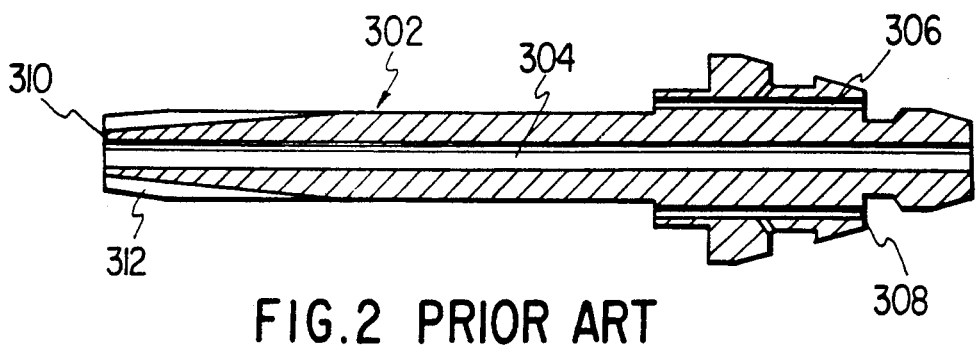
FIG. 2 is a longitudinal sectional view of a tip core of a conventional two-piece cutting tip.
Figure 3:
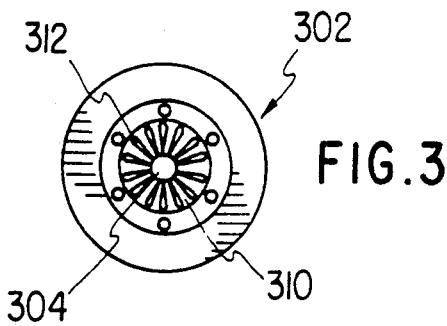
FIG. 3 is an end view of the cutting tip of FIG. 2.

A preferred embodiment of the present invention will now be described with reference to the attached figures, in which the same reference numerals are used to identify the same elements throughout the several views.

Referring to FIGS. 4, 5A, 5B, 5C and 5D, a cutting tip 2 is formed by assembling a tip core 10, a skirt 30 and a mixer 50. The cutting tip also includes a rubber O-ring 22 which cooperates with the mixer end 14 of the tip core in order to seal a cutting oxygen passage 16, as will be further described below. The tip core can be formed as a hollow cylinder, and is preferably formed from copper tubing. It has an outlet end 12, a mixer end 14 and the longitudinal cutting oxygen passage 16 extending between the ends 12 and 14. The exterior periphery of the tip core has a taper 19 adjacent the outlet end 12, for example one formed by swaging, and a reduced diameter discharge passage 18. Preferably, an annular, arcuate chamfer is formed around the discharge passage 18 at the outlet end 12.

The skirt 30, which is also preferably formed from copper tubing, has an outlet end 32 and a mixer end 34. A portion 36 of the length of the skirt adjacent the outlet end 32 is tapered by swaging. In addition, a plurality of circumferentially spaced swaged grooves 38, extending substantially in the direction of the length of the skirt, are formed in the internal surface of the skirt at the tapered outlet portion 36. The outer periphery of the skirt adjacent the mixer end 34 has screw threads 40.

The mixer 50 is preferably formed from machined brass. It forms a cap having a generally stepped conical shape with an axial bore 51 extending from its large diameter end 52 to its small diameter end 54. The bore is also stepped so as to form a large diameter threaded section 56, a smaller diameter passage section 58, a yet smaller diameter core fitting section 60 and a cutting oxygen inlet opening 62. The sections 56, 58 and 60 are separated by steps or shoulders. Moreover, the passage section 58 is tapered such that its diameter progressively increases toward section 56.

Figure 5A:
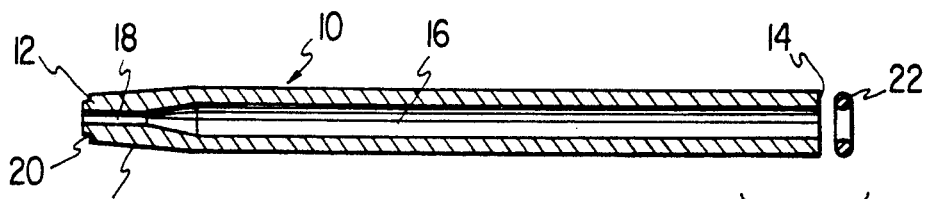
FIG. 5A is a longitudinal sectional view of a tip core of the cutting tip of FIG. 4.
Figure 5B:
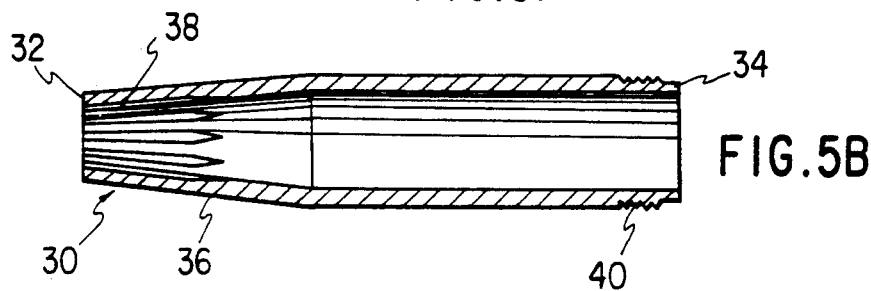
FIG. 5B is a longitudinal sectional view of the skirt of the cutting tip of FIG. 4.
Figure 5C:
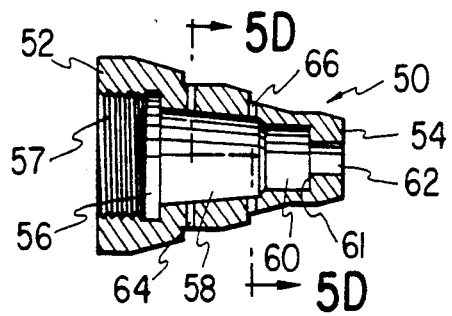
FIG. 5C is a longitudinal sectional view of the mixer of FIG. 4.
Figure 5D:
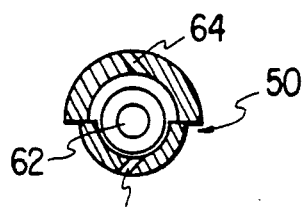
FIG. 5D is a sectional view of the mixer of FIG. 5C, taken along section lines D—D.

A circumferentially spaced plurality of tangential fuel gas inlet passages 64 extend through the peripheral wall of the mixer so as to reach the passage section 58 of the bore. The fuel gas is preferably acetylene, although other fuel gases may be used. A circumferentially spaced plurality of tangential preheat oxygen inlet passages 66 also extend through the peripheral wall of the mixer to a smaller diameter portion of the passage section 58 of the bore, at a position axially offset from the inlet passages 64. As best seen in FIG. 5D, the inlet passages 64 and 66 have mutually opposite orientations, as will be discussed further below.

Figure 4:
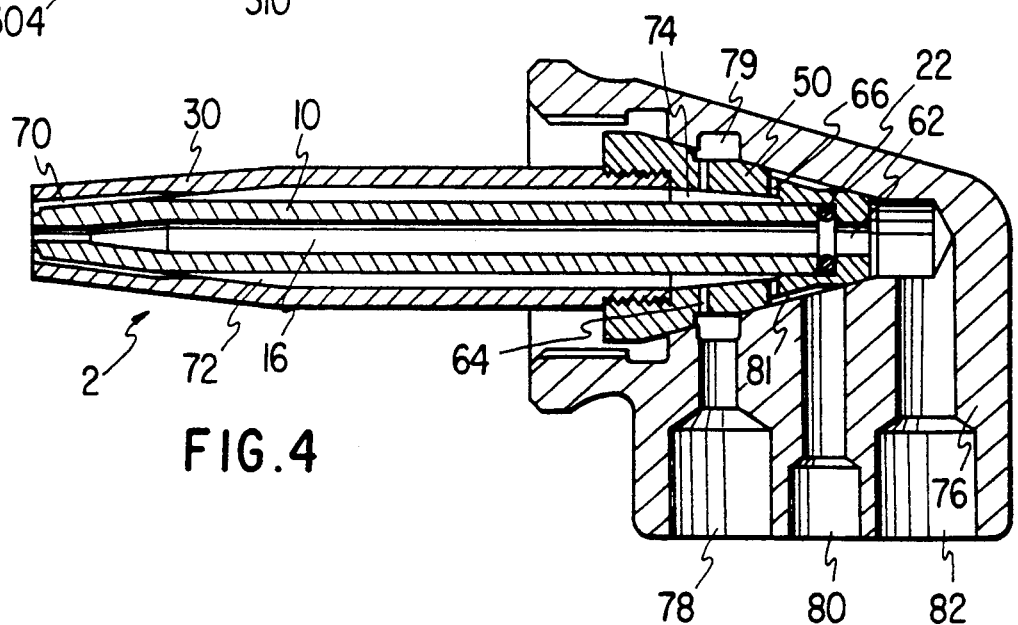
FIG. 4 is a longitudinal sectional view of the cutting tip of the present invention.

As best seen in FIG. 4, the mixer end 14 of the tip core 10 is fitted into the bore of the mixer 50 until it is snugly fit within the core fitting section 60 of the bore. At this time, the O-ring 22 is also fitted in the core fitting section and is held between the mixer end 14 of the tip core and a shoulder 61 at the bottom of the core fitting section 60. At the time, the cutting oxygen passage 16 communicates with the cutting oxygen inlet opening 62, and is sealed from the remainder of the bore 51 by the O-ring 22.

The skirt 30 is then concentrically fitted over the core tip 10 so that its mixer end 34 fits into the large diameter threaded section 56 of the mixer bore, after which the skirt can be threaded onto the mixer 50 by cooperation of the screw threads 40 of the skirt and screw threads 57 in the threaded section 56 of the bore. As the skirt is threaded into the mixer, the tapered inner surface of the tapered outlet portion 36 of the skirt approaches and contacts the tapered outer surface 19 adjacent the outlet end 12 of the tip core. The angle of taper of the tapered surface 19 of the tip core and the angle of taper of the tapered outlet portion 36 of the skirt are matched so that the two have a continuous surface contact, except for the grooves 38. The grooves 38 and the tapered surface 19 therefore cooperate to form a circumferentially spaced plurality of longitudinal outlet passages 70 which emerge from the tip at the outlet ends 12 and 32 of the tip core and skirt, respectively.

Once the skirt 30 is threaded tightly on the mixer 50, the tapered portion 36 of the skirt securely holds the tip core 10 in the position shown in FIG. 4, with an annular passage 72 being located between the tip core and the skirt along the entire length of the skirt, except for the portion having the outlet passages 70. In addition, the tip core is spaced from the wall of the mixer in the passage section 58 so as to form an annular space 74 which comprises a tapered axial extension of the annular passage 72. Due to the taper of the passage section 58, the sectional area of the annular space progressively increases toward the annular passage 72.

The assembled cutting tip 2 can then be inserted in a conventional cutting torch head 76, as shown in FIG. 4. The cutting torch head has conventional inlets 78, 80 and 82 for a fuel gas such as acetylene, preheat oxygen and cutting oxygen, respectively.

In operation, preheat oxygen is supplied to the preheat oxygen inlet 80 of the cutting torch head, from which it reaches an annular manifold chamber 81 surrounding the mixer in the region of the circumferentially spaced preheat oxygen inlet passages 66. A flow of preheat oxygen is thus charged into the annular space 74 via the preheat oxygen inlet passage 66. Since the preheat oxygen inlet passages 66 extend tangentially with a counterclockwise orientation (FIG. 5D), the charged preheat oxygen will have a counterclockwise (first) circumferential flow velocity component. Moreover, the preheat oxygen will form a vortex having an axial component directed toward the outlet of the tip, due to the taper of the passage portion 58, and so the counterclockwise swirling preheat oxygen will move axially toward the position of the fuel gas inlet passages 64.

Fuel gas is supplied to the fuel gas inlet passages 64 via the fuel gas inlet 78 in the cutting torch head and the annular manifold chamber 79 surrounding the mixer in the region of the fuel gas inlet passages 64. The circumferentially spaced fuel gas inlet passages 64 are also tangential, but with a clockwise orientation. Therefore, the fuel gas will enter the annular space 74 with a clockwise (second) flow velocity component, i.e., a circumferential flow velocity component which is opposite to that of the preheat oxygen. The interaction of the circumferentially oppositely directed fuel gas and preheat oxygen flows will cause a very rapid and aggressive mixing of the gases, while canceling the opposed circumferential flow components. As a result, there will rapidly form a substantially homogeneous mixture which is moving substantially axially toward the tip outlet with no circumferential or swirling flow components. A laminar gas flow can therefore rapidly be achieved.

According to a further feature of this embodiment of the invention, the sectional area of each of the outlet passages 70 progressively decreases along its length by 30% of its original value, in the gas flow direction. That is, the sectional areas of each of the grooves 38 progressively decreases in the flow direction from the annular passage 72 toward the outlet end 32 of the skirt. It has been found that this convergence improves the ability of the flowing gas mixture to achieve a laminar flow at the outlet of the cutter tip.

Figure 6:
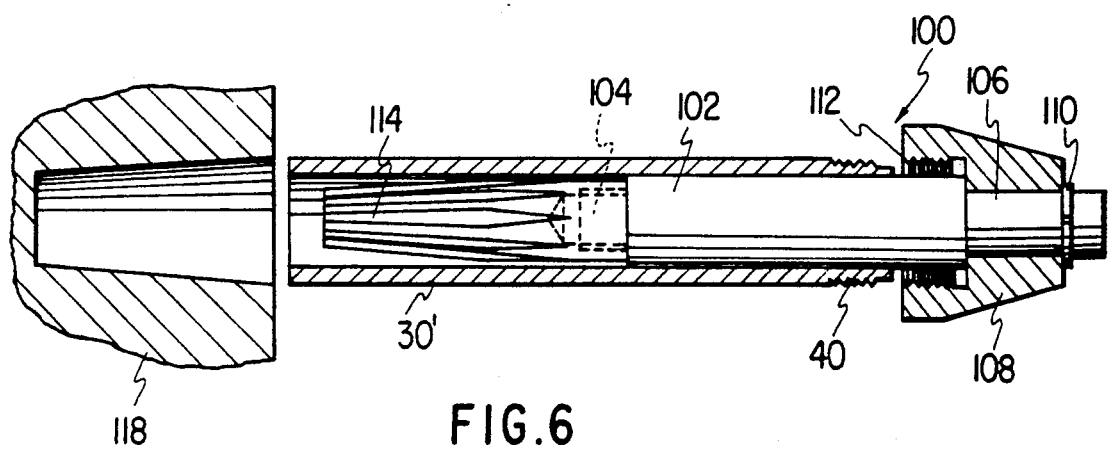
FIG. 6 shows a skirt precursor mounted to a swaging mandrel assembly in preparation for swaging.

FIGS. 6 and 7A-7D illustrate the swaging of the skirt 30. A skirt precursor 30' in the form of the length of copper tubing having screw threads 40 at one end is mounted on a swaging mandrel assembly 100, as shown in FIG. 6. The swaging mandrel assembly includes a mandrel core 102 which can be formed from a steel rod having a threaded axial extension 104 and an opposite, small diameter axial extension 106. A mandrel grip 108 is rotatably fitted over the small diameter extension 106 and is held in place by the retaining ring 110. The mandrel grip has internal screw threads 112 which can mate with the screw threads 40 of the skirt precursor.

Figure 7A:
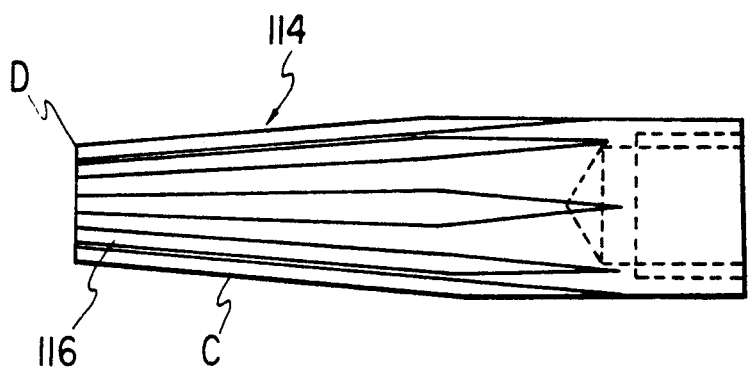
FIG. 7A is a side view of the swaging mandrel head of FIG. 6.
Figure 7B:
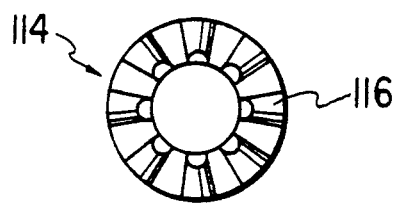
FIG. 7B is an end view of the swaging mandrel head of FIG. 7A.
Figure 7C:
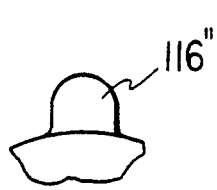
FIGS. 7C and 7D are details showing the groove forming mandrel projection profiles at points C and D of FIG. 7A, respectively.
Figure 7D:
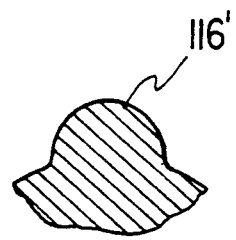

A mandrel head 114 is threaded onto the threaded extension 104 of the mandrel core. The mandrel head is formed of hardened tool steel, preferably machined out of blanks using wire EDM (electrodischarge machining), and is then nitrided for further hardening. It has a longitudinally tapered surface with longitudinally extending projections 116 which correspond to the internal grooves 38 to be formed in the skirt. FIG. 7C is a detail showing one of the projection sections 116' at position C along the length of the mandrel head, while FIG. 7D shows the projection section 116'' at position D along the length of the mandrel head. As can be seen from these figures, the projections are progressively narrowed so that the grooves 38 will progressively converge with a smaller sectional area, as described above.

For swaging, the skirt precursor, which can be partially threaded onto the mandrel grip, is first swaged in a tapered swaging die 118 to form the tapered portion 36 of the skirt. Subsequently, the skirt precursor is fully threaded onto the screw threads 112, as a result of which the mandrel head 114 advances into the tapered skirt precursor (to the left in FIG. 6). As the mandrel head advances, it swages the grooves 38 into the skirt precursor.

Since the outlet passages 70 are formed by the cooperation of the grooves 38 and the tip core, there is no need to mill, drill or otherwise machine the passages into a metal part, as was required in conventional cutting tips, thereby reducing the cost and difficulty of tip production. Moreover, the circumferentially oppositely directed inlets for the preheat oxygen and fuel gas create a swirling flow which promotes rapid mixing, but without leaving a rotating mixture flow. This, together with the converging sectional areas of the outlet passages, promotes the rapid formation of a laminar mixture flow in a short tip length.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter Patent of the United States is:

1. An oxy-fuel tip comprising:
   a tip core;
   a skirt concentrically surrounding said tip core so as to form an annular passage therebetween; and
   inlet means for supplying a fuel gas to said annular passage,
   wherein an outlet portion of said skirt is swaged to form gas outlet passages in cooperation with said tip core, and
   wherein said outlet passages are shaped along their lengths such that the sectional areas thereof are progressively reduced by 30% along their lengths in a direction of gas flow therethrough, in order to achieve a laminar gas flow at the outlet of the tip.

2. The oxy-fuel tip of claim 1 wherein said outlet passages are in part defined by the tip core, and wherein a distal end of said tip core is chamfered.

3. An oxy-fuel cutting tip comprising:
   a mixer having respective cutting oxygen, preheat oxygen and fuel gas inlet passages;
   a tip core fittable into said mixer so as to communicate with said cutting oxygen inlet and having a cutting oxygen passage extending therethrough to an outlet end thereof; and
   a skirt concentrically surrounding said tip core so as to form an annular passage therebetween, said skirt being swaged adjacent an outlet end thereof to define a tapered outlet portion having internal grooves, an opposite end of said skirt opposite said outlet end being fittable into said mixer such that said annular passage communicates with said preheat oxygen and fuel gas inlet passages and such that said internal grooves cooperate with said tip core to define outlet passages for gas in said annular passage,
   wherein said preheat oxygen inlet passage comprises means for introducing the preheat oxygen into a tapered extension of said annular passage with a first circumferential flow velocity component, said extension being tapered with an increasing area in a direction toward said outlet passages, and wherein said fuel gas inlet passage comprises means for introducing the fuel gas into said annular passage with a second circumferentail flow velocity component which is opposite to said first circumferential flow velocity component, whereby said circumferential flow velocity components are substantially cancelled.

4. The tip of claim 3 including sealing means in said mixer for sealing said cutting oxygen passage from said annular passage.

5. The tip of claim 4 wherein said sealing means comprises an O-ring.

6. The tip of claim 4 including means for fixing said skirt to said mixer, wherein said tip core is held fitted to said mixer by said tapered outlet portion of said skirt engaging said tip core when said skirt is fixed to said mixer.

7. The tip of claim 6 wherein said tip core has a tapered outlet end which is engaged by said tapered outlet portion of said skirt to define said outlet passages when said skirt is fixed to said mixer.

8. The tip of claim 7 wherein said fixing means comprise cooperating screw threads on said opposite end of said skirt and on said mixer.

9. The tip of claim 2 wherein said mixer comprises an annular cap having a peripheral wall and an axial bore extending therethrough to define two end openings, wherein said tip core is fittable into said bore through one of said end openings and is sealingly engaged with said mixer via a sealing ring, with said cutting oxygen passage communicating with the other of said end openings which comprises said cutting oxygen inlet passage.

10. The tip of claim 9 wherein said tapered extension of said annular passage comprises an annular space between said tip core fitted in said bore and said peripheral wall, and wherein said preheat oxygen inlet and said fuel gas inlet form passages extending through said peripheral wall into said annular space.

11. The tip of claim 10 wherein the passages extending through said peripheral wall formed by said preheat oxygen inlet and said fuel gas inlet are offset from any radius line of said axial bore, whereby the preheat oxygen and the fuel gas are introduced into said tapered extension with respective first and second circumferential flow velocity components.

12. The tip of claim 11 wherein said passages extending through said peripheral wall are oriented such that first and second circumferential flow velocity components are oriented opposite one another, whereby said flow velocity components are substantially canceled.

13. The tip of claim 12 wherein said outlet passages are shaped along their lengths such that the sectional areas thereof are progressively reduced by 30% along their lengths in a direction of gas flow therethrough.

* * * * *